United States Patent [19]

Hirose et al.

[11] Patent Number: 4,981,409
[45] Date of Patent: Jan. 1, 1991

[54] CARTRIDGE AUTO CHANGER

[75] Inventors: Yoshihiko Hirose, Yokohama; Noboru Kohmura, Narashino; Shigeru Sugita, Sayama; Tadashi Sato, Kokubunji, all of Japan

[73] Assignee: Canon Kabushiki Kaisha, Tokyo, Japan

[21] Appl. No.: 492,229

[22] Filed: Mar. 13, 1990

Related U.S. Application Data

[63] Continuation of Ser. No. 259,416, Oct. 18, 1988, abandoned, which is a continuation of Ser. No. 849,284, Apr. 8, 1986, abandoned.

[30] Foreign Application Priority Data

Apr. 16, 1985 [JP] Japan ................................. 60-081157
Apr. 24, 1985 [JP] Japan ................................. 60-087850
Jul. 29, 1985 [JP] Japan ................................. 60-167055

[51] Int. Cl.$^5$ .............................................. B65G 1/06
[52] U.S. Cl. ................................... 414/225; 414/226; 414/273; 414/280; 414/331; 414/754; 414/781; 901/6
[58] Field of Search ............... 414/331, 787, 774, 754, 414/781, 783, 757, 273, 280, 223, 225, 226; 901/6, 7; 198/345, 374, 394, 395, 399, 410, 434, 456, 468.2

[56] References Cited

U.S. PATENT DOCUMENTS

| | | | |
|---|---|---|---|
| 3,466,514 | 9/1969 | Brunner et al. | 414/754 X |
| 3,503,527 | 3/1970 | Devol | 901/6 X |
| 3,631,955 | 1/1972 | Chaplinski | 198/394 X |
| 3,820,647 | 6/1974 | Waugh, Jr. et al. | 414/757 X |
| 4,042,122 | 8/1977 | Espy et al. | 414/783 X |
| 4,407,627 | 10/1983 | Sato et al. | 414/787 X |
| 4,614,474 | 9/1986 | Sudo | 414/331 X |
| 4,651,863 | 3/1987 | Reuter et al. | 414/223 X |
| 4,657,475 | 4/1987 | Ohtsuji et al. | 414/781 X |

FOREIGN PATENT DOCUMENTS 186808 10/1984 Japan ..................... 414/331

Primary Examiner—David A. Bucci
Attorney, Agent, or Firm—Fitzpatrick, Cella, Harper & Scinto

[57] ABSTRACT

A catridge changer for carrying a cartridge to a utilization position and returning it to its initial position after the utilization thereof has a cartridge containing chamber for containing a number of cartridges therein, a hand member for gripping a selected cartridge, a hand moving device for moving the hand member gripping the selected cartridge to the cartridge containing chamber and the utilization position to carry the cartridge, and a correcting device for correcting the posture of the cartridge gripped by the hand member to a regular posture.

7 Claims, 8 Drawing Sheets

CARTRIDGE AUTO CHANGER

This application is a continuation of application Ser. No. 07/259,416 filed Oct. 18, 1988, which is a continuation of application Ser. No. 06/849,284, filed Apr. 8, 1986, both now abandoned.

BACKGROUND OF THE INVENTION

1. Field of the Invention

This invention relates to a cartridge autochanger.

2. Related Background Art

A cartridge auto-changer (hereinafter referred to as the CAC apparatus is an apparatus) which chiefly comprises a cartridge container portion containing therein a number of cartridges (including cassettes) address-arranged, a conveying mechanism including a cartridge hand (catching and liberating) mechanism, and an apparatus operation control circuit including necessary cartridge designating means, and automatically executes operations such as search and extraction of a designated one of the numerous cartridges within the cartridge container, conveyance of the designated cartridge to the cartridge mounting portion (predetermined port) of an instrument used for cartridge mounting and mounting of the necessary cartridge onto the cartridge mounting portion, and return conveyance and recontainment of the used cartridge. It is an apparatus which automatically effects the operation of searching for a designated desired cartridge of a number of microfilm cartridges. These cartridges are address-arranged and contained one by one in number of shelf portions of a rotatable drum shelf type cartridge container. This is done, for example, by catching the cartridge by a hand mechanism, conveying the cartridge to the cartridge mounting portion of a microfilm instrument such as a microfilm reader or a microfilm reader printer and mounting the cartridge onto said cartridge mounting portion. The operation of catching the cartridge used on the microfilm instrument side by the hand mechanism, conveying the cartridge back to a predetermined containing shelf of the container and recontaining the cartridge in said predetermined containing shelf, is done by an apparatus effective in making efficient use of microfilm.

For the sake of convenience, description will hereinafter be made, for example, of a CAC apparatus for automatically mounting a microfilm cartridge onto the car mounting portion of a main apparatus such as a reader.

The conveyance of a necessary cartridge to the cartridge mounting portion of the main apparatus such a the reader and the mounting of the cartridge onto the cartridge mounting portion, by the CAC apparatus, must always be effected with the cartridge being caught by a hand mechanism in a posture wherein the cartridge regularly mounted on the mounting portion. That is, the cartridge must be in a posture in which the cartridge just faces the mounting portion in all of the regular longitudinal directions, the left to right direction and the front to back direction.

When the cartridge is conveyed to the mounting portion while being caught in its improper posture by the hand mechanism, the cartridge interferes with the mounting portion and is not or cannot be smoothly inserted thereinto. If the cartridge is inserted with its longitudinal direction reversed, or with its sides facing laterally or with its front and back surfaces inverted, the film feeding operation on the side of the main apparatus such as the reader will not be accomplished.

Actually, however, it is often the case that the cart ridge is conveyed to the mounting portion of the main apparatus, such as the reader, while being caught in its improper posture by the hand mechanism. For example, if the posture of the cartridges contained on the individual containing shelves of the cartridge container portion is obliquely laterally facing beyond a certain degree relative to the regular posture due to the operational vibrations or the like of the apparatus, the cartridges are liable to be caught in their obliquely laterally facing improper posture by the hand mechanism. Also, when cartridges are to be initially address-arranged and placed into the containing shelves of the cartridge container portion, or when cartridges are supplied into empty shelves, some of the cartridges are contained with their longitudinal direction reversed or with their sides facing laterally or with their top and bottom inverted. If such cartridges are left as they are, those cartridges will be caught in their improper posture such as reversed longitudinal direction, lateral direction or inverted posture by the hand mechanism.

Also, the catching of a desired cartridge by the hand mechanism is accomplished by the pair of hands of the hand mechanism being held open over the grip width of the cartridge. In this state, the hand mechanism is moved forward relative to the desired cartridge so that the cartridge is received between the opened hands. The hands are closed to hold the cartridge therebetween. Then, the hand mechanism is moved in a rearward direction whereby the desired cartridge caught by the hand mechanism is drawn out of the containing portion and conveyed to the cartridge mounting portion of the reader or the like. The cartridge is then returnconveyed to the containing shelf from the cartridge mounting portion. The conveyance (including the return conveyance) of the cartridge is generally executed by the cooperation among a vertically moving mechanism, a cocking mechanism and a pivotally moving mechanism for the hand mechanism which are provided in addition to a forward and rearward moving mechanism for the hand mechanism.

The hand mechanism as described above has often experienced a trouble that the caught object to be gripped slips off from between the hands and falls in the conveyance process thereof. This may be attributed to a vibration, disturbance to the phenomenon that due to the vibration, disturbance or the like of the apparatus. The hands in their closed state sway in the opening directions against their closing forces and the catching forces of the hands with respect to the object to be gripped fluctuate vibrationally.

So, with vibrational force or the like of the apparatus which acts on the hands being taken into account, a countermeasure is adopted, such as setting the catching forces of the hands to a considerably strong level or attaching high-friction elastic members as anti-slippage means to the hands and catching the object to be gripped between those high-friction elastic members.

However, the former method of setting the catching forces to a strong level gives rise to the necessity of corresponding increasing the strength of the components, which in turn leads to a secondary disadvantage such as bulkiness and increased weight of the apparatus.

The latter method of adding the high-friction elastic members has suffered from the fast reduction in the frictional property and elasticity of those numbers resulting from adherence of dust thereto, stain, aging the like thereof, and the variations in the frictional property and elasticity of those members resulting from temperature change, and had a low reliability because of the numerous unstable factors.

Further, the catching of a desired cartridge by the hand mechanism is accomplished by the hand mechanism. The desired cartridges are moved together (generally the hand mechanism being moved forwardly toward the desired cartridge) with the pair of hands of the hand mechanism being held open over the grip width of the cartridge, the cartridge being thus received between the opened hands. The hand mechanism and the desired cartridge are moved together by a predetermined amount, and thereupon the hands are closed and the cartridge is received and held between the hands. Thereafter, conveyance of the desired cartridge caught by the hand mechanism is executed by the operation of a carrier mechanism holding the hand mechanism.

The conventional hand opening-closing mechanism has been of the link type, the rack-pinion type, the gear-cam type or the tension wire type. The link type has suffered from problems such as low efficiency of force transmission and increased weight and increased cost of the apparatus resulting from an increased number of parts. The rack-pinion type and the gear-cam type have suffered from problems such as the additional time required for the adjustment of the amount of opening-closing of the hands and the difficulty encountered in effecting such adjustment. The tension wire type is low in reliability due to the strain on the wire and requires a great amount of wire pulling stroke. This greatly hampers compactness and light weight of the hand mechanism.

SUMMARY OF THE INVENTION

The present invention has been made in view of the above-noted situation and an object thereof is to provide a CAC apparatus designed such that the conveyance of a cartridge to a predetermined port of the cartridge mounting portion of a main apparatus such as a reader and the mounting of the cartridge onto the cartridge mounting portion is effected always with the cartridge being caught by a hand mechanism in a posture which permits the cartridge to be mounted regularly.

It is another object of the present invention to provide a hand mechanism which ensures that an object to be gripped is caught and conveyed stably without the catching force of the hands with respect to the object to be gripped being enhanced more than necessary. Accordingly, a compact and light-weight apparatus may be applied without the trouble of falling.

It is still another object of the present invention to provide a practical hand mechanism which requires a small number of parts and which is high in reliability and can be made compact and light in weight.

The present invention is a cartridge auto-changer for catching and extracting a necessary cartridge in a cartridge container by a conveying mechanism including a cartridge hand mechanism and conveying it to a predetermined port. This is done by the provision of a cartridge posture correcting mechanism for correcting the posture of the cartridge caught by the hand mechanism to a regular posture in a process wherein the cartridge caught and extracted from the cartridge container by the hand mechanism is conveyed to the predetermined port.

That is, by the provision of the above-described cartridge posture correcting mechanism, even if the cartridge in the cartridge container is conveyed toward the predetermined port of the mounting portion of the main apparatus, such as the reader, while being caught in an improper posture by the hand mechanism, the improper posture is corrected to a regular posture in the course of the conveyance. Therefore, the cartridge is conveyed to the predetermined port always in the regular posture and mounted thereon.

Also, the present invention is a hand mechanism having a pair of opening-closing hands and movable forward and backward toward and away from an object to be gripped and receiving the object to be gripped between the opened hands by forward movement and catching the object to be gripped between the hands by the closing operation thereof and extracting and moving the caught object to be gripped by backward movement. This is accomplished such that at a position outside each of the pair of hands, a hand opening movement control member parallel to the direction of reciprocal movement of the hand mechanism and having an inner surface spacing substantially equal to the dimension between the outer surfaces of the hands closed relative to each other is disposed from a predetermined spaced position set between said position and the object to be gripped to the backward movement terminal position of the hand mechanism.

Further, the present invention is a hand mechanism having a pair of hands pivotably about respective axes and receiving an object to be gripped between the hands opened relative to each other and catching the object to be gripped between the hands by the closing pivotal movement of the hands relative to each other. There is provided a rod member movable forward and backward between the hands by a drive source, and both ends of the rod member are related to the hands adjacent to said ends so that said pair of hands are pivoted in their mutually opening directions by the forward movement of said rod member and are pivoted in their mutually closing directions by the backward movement of said rod member.

DESCRIPTION OF THE PREFERRED EMBODIMENTS

Figure 1:
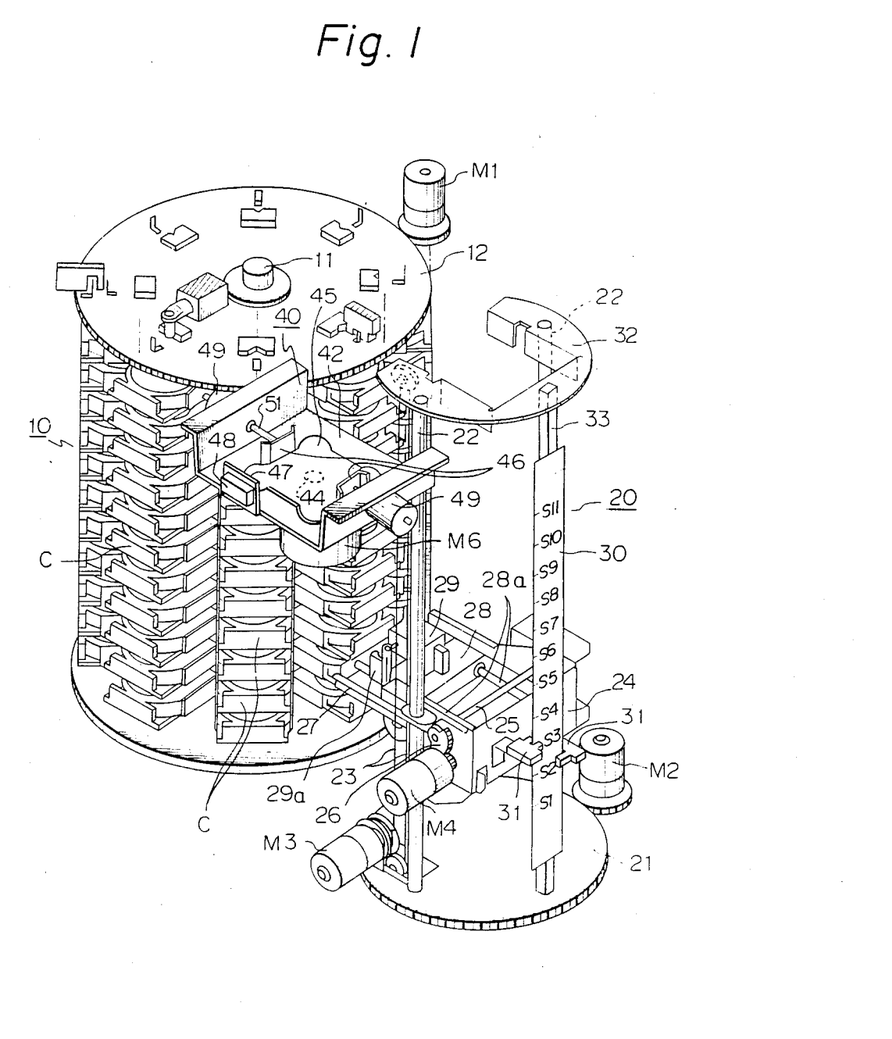
FIG. 1 is a perspective view of the internal mechanism of a CAC apparatus.

FIG. 1 is a perspective view of the internal mechanism of an apparatus according to an embodiment of the present invention.

In FIG. 1, reference numeral 10 designates a rotational drum type cartridge containing shelf (hereinafter referred to as the drum shelf) as a cartridge container portion, reference numeral 20 denotes a cartridge conveying mechanism disposed by the side of the drum shelf, and reference numeral 40 designates a cartridge posture correcting mechanism disposed sideways of the upper portion of the conveying mechanism.

The drum shelf 10, which is rotatable about a shaft 11, comprises a number of cartridge containing shelves arranged in multiple stages (in the present embodiment, eight columns and eleven stages) and is rotatively driven by a motor M1 and a gear disc 12. Cartridges C each containing therein a roll of microfilm on which address-arranged images are recorded are contained in the individual shelves.

The cartridge conveying mechanism 20 comprises a gear disc 21 rotatable about a vertical axis by a motor M2, a first carriage 24 vertically driven by a motor M3 along parallel vertical guide rods 22 studded on the gear disc 31, a cockable plate 27 disposed on the first carriage 24 and cockably driven about a horizontal shaft 25 by a motor M4 and a sector gear 26, a second carriage 28 disposed on the cockable plate 27 and reciprocally driven along guide rods 28a by an unshown motor (M5) and wire, a cartridge conveying mechanism 29 supported on the second carriage 28, and a slit arrangement plate 30 and photosensors (photointerrupters) 31 for detecting the position of the first carriage 24 vertically moved along the vertical guide rods 22. Reference numeral 32 designates the upper end plate of the cartridge conveying mechanism, and reference numeral 33 denotes an auxiliary stay parallel to the vertical guide rods 22. The slit arrangement plate 30 is mounted and supported on the stay 33.

The cartridge posture correcting mechanism 40 (FIGS. 1 to 3) comprises a fixed shelf plate 42 mountingly supported on the inner surface of the top plate 41 of the CAC apparatus and having at least the front side thereof opened as a cartridge insertion- removal port 43, a motor M6 mounted and supported on the underside of the shelf plate 42 and having its rotary shaft 44 vertically extending through the substantially central portion of the upper surface of the shelf plate, a horizontal rotatably plate 45 having the central portion of its underside mounted and supported on the upper surface of said rotary shaft, parallel cartridge side keep plates 46 disposed on the left and right sides of the fixed shelf plate 42 and normally biased in a direction hold the horizontal rotatably plate 45 therebetween and a detector 48 mounted and supported by a riser piece 47 on the rear side of the fixed shelf plate 42.

The horizontal rotatably plate 45 is of a shape in which the four corners of a square plate substantially corresponding to the planar configuration of the cartridge C are made into substantially semicircular cartridge 45a, and is horizontally rotatably driven clockwise or counter-clockwise on the fixed shelf plate 4 about a shaft 44 by a motor M6.

Figure 2:
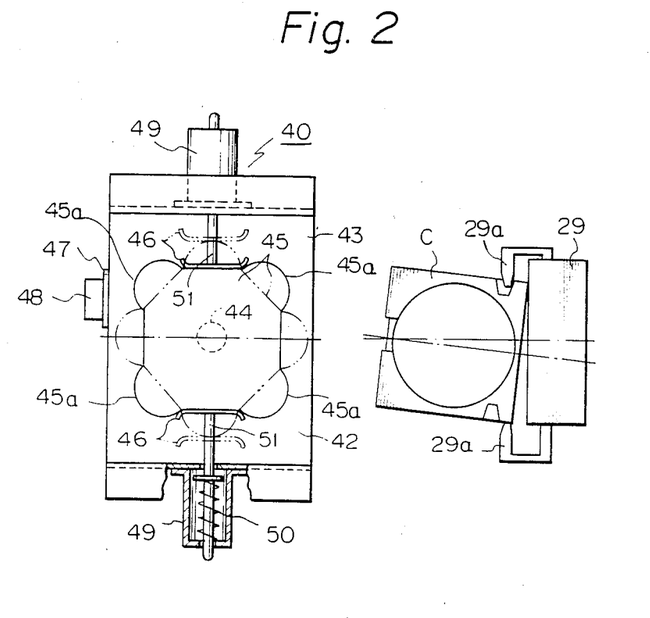
FIG. 2 is a plan view of a cartridge posture correcting mechanism.
Figure 3:
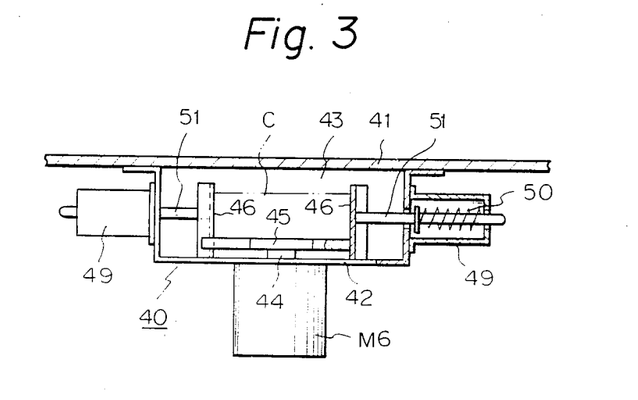
FIG. 3 is a front view of the cartridge posture correcting mechanism.

Reference numeral 49 designates spring housings fixedly mounted to the outer surfaces of right side walls of the fixed shelf plate 4 numeral 50 denotes coil springs contained within the respective spring housings, and reference numeral 51 designates a rod extending from within each housing 49 through the left and right side walls of the fixed shelf plate 42 into the interior of the side walls. The rods 51 are normally biased into the interior of the side walls by the coil springs 50 within the housings 49. The left and right cartridge side keep plates 46 are mounted and supported on the fore end portions of the rods 51 which are adjacent to the fixed shelf plate, and are normally received by striking against the left and right sides of the horizontal rotatable plate 45 as shown in FIGS. 2 and 3.

Figure 4:
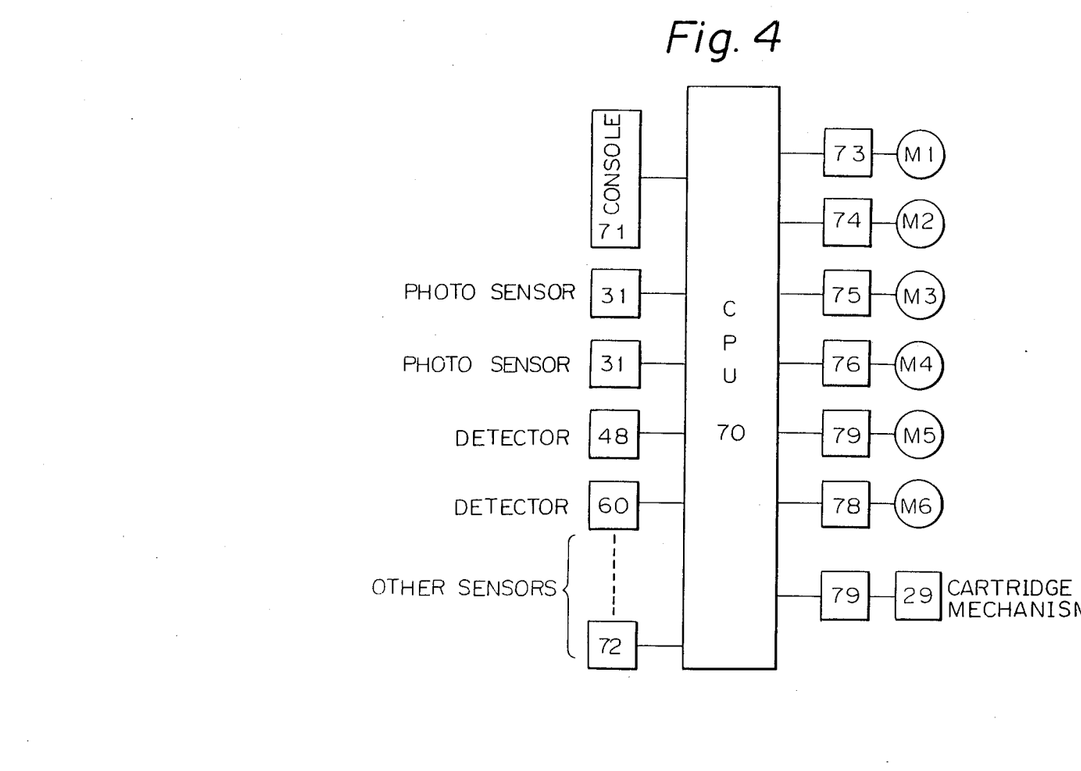
FIG. 4 is a block diagram of a control circuit system.

FIG. 4 is a block diagram of an apparatus control circuit system. In FIG. 4, reference numeral 70 designates a main control circuit (CPU) which receives various key operating signals from an apparatus console 71 to thereby set the control conditions or the like of the apparatus. The CPU also receives as inputs the output signals from photosensors 31, detectors 48, 60 and other sensors 72 for detecting the operations of various mechanisms. Reference numerals 73–78 denote the drive control circuits of the motors M1–M6 for driving various mechanisms, and reference numeral 79 designates an operation control circuit for the cartridge hand mechanism 29. These are mutually controlled by the main control circuit 70 in accordance with predetermined control conditions set and input to this circuit and signal conditions fed back to this circuit.

(1) Search of a Necessary Cartridge

By the key operation of the console 71, the number (address) of a necessary cartridge is designated and input to the main control circuit 70, and a search starting key is depressed.

Thereupon, the shelf column and stage level in the drum shelf 10 wherein the designated necessary cartridge is present are operated. The drum shelf 10 is then rotated about the vertical shaft 11 by the motor M1 and the gear disc 12 so that the shelf column corresponding to that operated shelf column becomes opposed to the position of the conveying mechanism 20.

On the other hand, the first carriage 24 of the cartridge conveying mechanism 20 is moved up or down along the vertical guide rods 22 by the DC motor M3 and the tension wire 23 so that the cartridge hand mechanism 29 mounted on the first carriage through the cockable plate 27 and the second carriage 28 is positioned at the shelf level corresponding to said operated level.

Thus, the shelf on which the necessary cartridge is present and the hand mechanism 29 becomes opposed to each other. That is, a desired cartridge C is searched at the position of the hand mechanism. FIG. 1 shows a state in which the hand mechanism 29 is opposed to the third lowest shelf in a certain shelf column and the cartridge on this shelf has been searched.

(2) Extraction of the Searched Cartridge

When the above-described search of the necessary cartridge is effected, the hand mechanism 29 is moved forward toward the cartridge containing shelf by the second carriage 28 being driven forward and the rear end of the desired cartridge is caught by the hands 29a of the hand mechanism. Thereafter, the second carriage 28 is moved rearward, whereby the desired cartridge is caught by the hand mechanism 29 and extracted, that is, removed from the shelf in which it is contained.

(3) Conveyance of the Extracted cartridge C to the Posture Correcting Mechanism 40

When the desired cartridge is extracted as described above, the first carriage 24 is moved up an when the cartridge C caught by the hand mechanism 29 arrives at a level corresponding to the level of the horizontal rotatable plate 45 of the posture correct mechanism 40, the upward movement of the first carriage 24 is stopped. Also, with the upward movement of the first carriage 24, the gear disc 21 is rotated clockwise or counter-clockwise by the motor M2, and the rotation of the gear disc 21 is stopped when this gear disc is rotated by an angle at which the longitudinal axis of the hand mechanism 29 is substantially coincident with the longitudinal axis of the posture correcting mechanism 40.

That is, by the above-described operation of the apparatus, the hand mechanism 29, which catches the cartridge C, finally becomes opposed to the cartridge insertion-removal port 43 in the front side of the fixed shelf plate 42 of the posture correcting mechanism 40, as shown in FIG. 2.

(4) Correction of the Posture of the Cartridge

Upon termination of the conveyance of the cartridge to the posture correcting mechanism 40, the second carriage 28 is driven forward, whereby the cartridge C caught by the hand mechanism 29 moves into the fixed plate 42 and is inserted onto the horizontal rotatable plate 45 and between the left and right cartridge side keep plates 46.

When a predetermined amount of forward movement of the second carriage 28, i.e., the hand mechanism 29, is terminated, the left and right hands 29a of the hand mechanism 29 are opened and the caught cartridge C is liberated.

By this liberation of the cartridge C, the cartridge C has its left and right sides pressed on the horizontal rotatable plate 45 by the parallel keep plates 46, and the longitudinal axis of the cartridge is subjected to a rotational moment in a direction parallel to the surfaces of the parallel keep plates. Thus, even if the cartridge C caught by the hand mechanism 29 and conveyed from the drum shelf 10 side is in its obliquely laterally facing improper posture (FIGS. 2 and 6(b)), the obliquely laterally facing improper posture is corrected to a regular posture just opposed to the hand mechanism 29.

Also, whether the inserted fore end of the cartridge C inserted into the posture correcting mechanism 40 is the front side of the cartridge C is discriminated by the detector 48. This discrimination of the front side of the cartridge C can be accomplished by a photoelectric detector or the like detecting the difference in shape or color between the front side and the other sides (rear side and left and right sides) of the cartridge C, which difference results from the presence of a window portion through which the film is paid away or from the exposure of the film surface.

Thus, when it is discriminated by the detector 48 that the inserted fore end of the cartridge C is the front side of the cartridge C, the hands 29a of the hand mechanism 29 are closed on the basis of the discrimination signal and the posture-corrected cartridge C in the posture correcting mechanism 40 is again caught by the hand mechanism 29, and then is taken out of the posture correcting mechanism 40 with the aid of the backward movement of the second carriage 28, namely, the hand mechanism 29.

Figure 6:
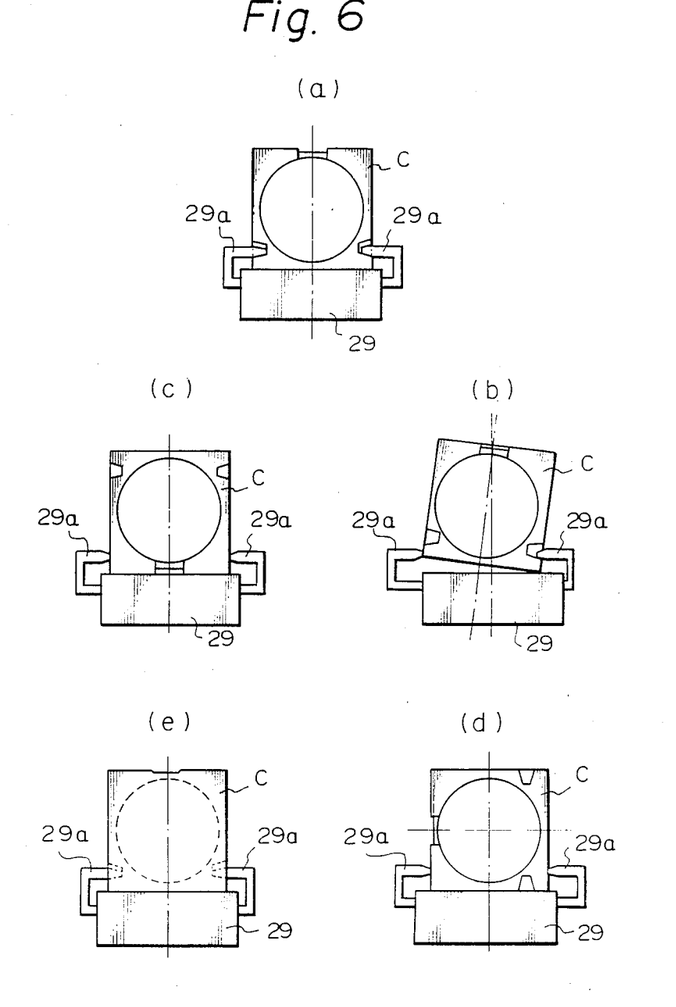
FIG. 6(a) shows a cartridge as it is caught in a regular posture by a hand mechanism.
FIGS. 6(b) to 6(e) show the cartridge as it is caught in an improper posture.

When it is discriminated by the detector 48 that the inserted fore end of the cartridge C is not the front side of the cartridge C, the cartridge C caught by the hand mechanism 29 and conveyed from the drum shelf 10 side is in its longitudinally reversed posture as shown in FIG. 6(c) or in its laterally facing posture as shown in FIG. 6(d). In such case, the hand mechanism 29 is moved rearward from within the posture correcting mechanism 40 and stands by, and then the horizontal rotatable plate 45 is intermittently rotated clockwise or counter-clockwise by 90° each by the operation of the motor M6. With this rotation of the horizontal rotatable plate 45, the cartridge C thereon rotates by 90° each. When the cartridge C front side discrimination signal is put out from the detector 48 in this intermittent 90° rotation process, the intermittent 90° rotation of the horizontal rotatable plate is stopped thereafter. Thus, the direction of the cartridge C in the posture correcting mechanism 40 is corrected to the regular longitudinal direction.

The hand mechanism 29 is then moved forward to catch the cartridge C in the posture correcting mechanism 40 again, whereafter the hand mechanism 29 is moved rearward to thereby permit the cartridge C to be taken out.

Thus, the cartridge C caught by the hand mechanism 29 via the posture correcting mechanism 40 and taken out in the above-described manner, is in its regular posture, apart from the reversal of the cartridge.

(5) Conveyance of the Cartridge C to a Predetermined Port Correction of the Reversal and Mounting of the Cartridge C The cartridge C taken out of the posture correcting mechanism 40 with the aid of the backward movement of the hand mechanism 29 assumes its vertically facing posture while remaining caught by the hand mechanism 29 by the cockable plate 27 being upwardly pivoted on the first carriage 24 about the horizontal shaft 25 by the motor M4 and the sector gear 26.

The first carriage 24 is moved upwardly to its upward movement limit.

The gear disc 21 is rotated clockwise or counter-clockwise by a predetermined angle by the motor M2. Thereby the cartridge C, vertically caught by the hand mechanism 29, is rotated about its vertical axis to assume a posture angle just corresponding to the cartridge mounting portion 100 (FIG. 5) of a main apparatus (image reproducing apparatus) such as a microfilm reader positioned above the conveying mechanism 20. Whether one side surface of the cartridge C faces a detector 60 (FIG. 5) and that cartridge surface is the front side of the cartridge is discriminated.

Figure 5:
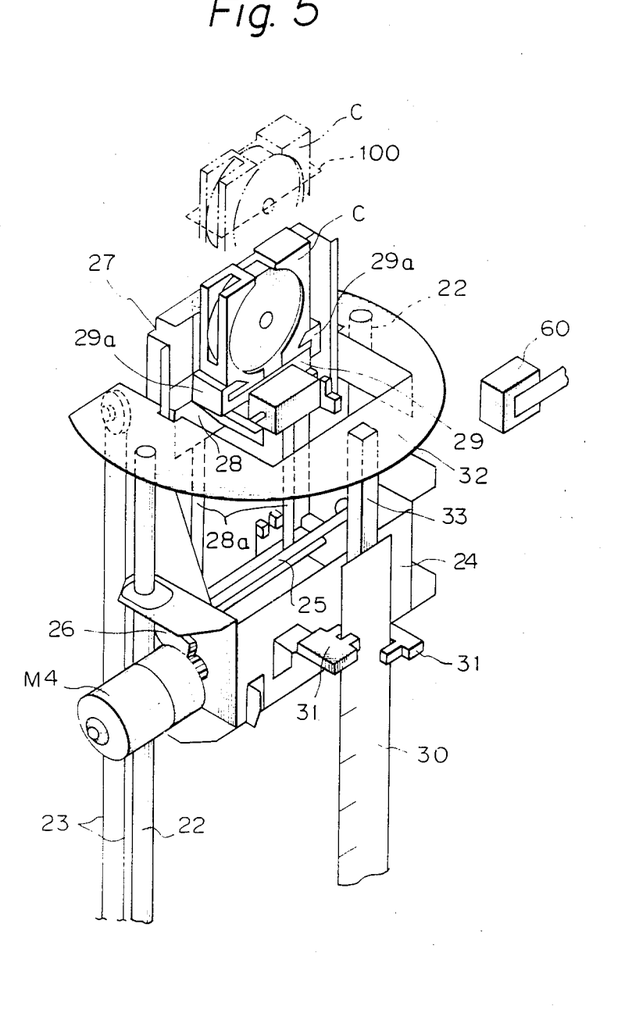
FIG. 5 is a perspective view of a cartridge at a stage shortly before it is inserted into and mounted on the cartridge mounting portion of a main apparatus such as a reader.

When it is discriminated that said one side surface is the front side, the second carriage 28 is moved forwardly and in this case, the cockable plate 27 is cocking and therefore, the second carriage 28 is moved up and accordingly the hand mechanism 29 is moved up, and the cartridge C, vertically caught by the hand mechanism 29, is moved up and inserted into the cartridge mounting portion 100 of the present apparatus such as the reader, thereby assuming its mounted position (indicated by dots-and-dash lines in FIG. 5).

When it is discriminated that said one side surface is not the front side, the cartridge C is caught by the hand mechanism 29 while being reversed and in this case, the gear disc 21 is rotated clockwise or counter-clockwise by 180° by the motor M2 on the basis of the discrimination signal. Thereby the front and back surfaces of the cartridge C relative to the cartridge mounting portion 100 of the present apparatus such as the reader are changed over into their proper directions. Then, in the same manner as previously described, the second carriage 28, namely, the hand mechanism 29, is moved forward (upward) and the cartridge C is inserted into and mounted on the cartridge mounting portion of the present apparatus such as the reader.

(6) Return Conveyance and Re-containment of the Used Cartridge

When the use of the cartridge C automatically mounted in the above-described manner is terminated in the main apparatus such as the reader, the return key of the console portion 71 is depressed. Thereupon the mounting cartridge C is drawn out downward from the mounting portion 100 of the main apparatus such as the reader with the aid of the backward movement (downward movement) of the second carriage 28, namely the backward movement (downward movement) of the hand mechanism 29. When the cartridge C is completely drawn out, the downward movement of the first carriage 24, the downward pivotal movement of the cockable plate 27 and the rotation of the gear disc 21 take place together with one another and the cartridge C is conveyed back to the initial shelf portion position on the drum shelf 10 side. The cartridge thus conveyed back is then inserted into the original shelf portion with the aid of the forward movement of the hand mechanism 29 by the forward movement of the second carriage 28 and is re-contained therein in its proper posture. The hand mechanism 29 liberates the recontained cartridge, whereafter it is driven rearward and thereafter, the apparatus stands by until the search of the next necessary cartridge is started.

In the above-described embodiment, it is also possible that at a point of time whereat the necessary cartridge has been caught and extracted from the drum shelf 10 side by the hand mechanism 29, or in the process until the cartridge is conveyed to the posture correcting mechanism 40, whether the cartridge caught in its regular posture by the hand mechanism is detected by a detector and if it is caught in its regular posture, the conveyance of the cartridge to the posture correcting mechanism 40 is omitted and the cartridge is conveyed to and mounted onto the cartridge mounting portion of the main apparatus, such as the reader, and only when it is discriminated that the cartridge is not in its regular posture, the cartridge is conveyed to and mounted onto the mounting portion via the posture correcting mechanism 40.

As described above, according to the present invention, the cartridge automatically conveyed to and mounted onto the predetermined port of the cartridge mounting portion of the main apparatus, such as the reader, from the cartridge container portion can always be corrected into a state in which the cartridge is caught by the hand mechanism so that it is mounted in its regular posture on the predetertermined port, and the used cartridge can be re-contained into the original container portion in the proper posture, and thus, the intended purposes can be achieved.

Figure 7:
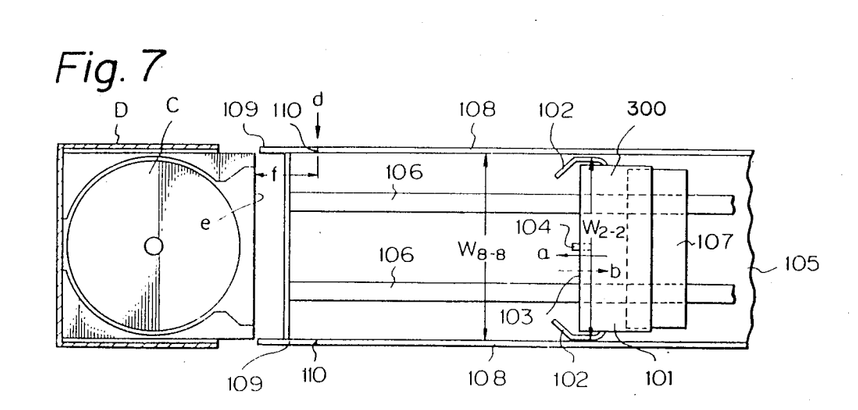
FIG. 7 is a plan view of another embodiment of the hand mechanism showing the hand mechanism as i is moved forward relative to the cartridge.
Figure 8:
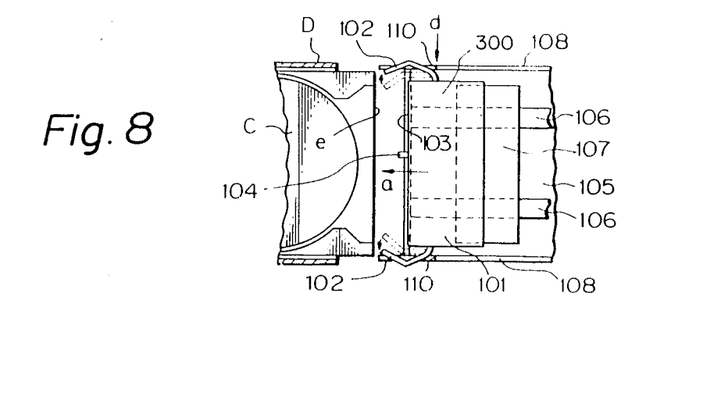
FIG. 8 is a view similar to FIG. 7 but showing the hands as they are opened to receive the cartridge.
Figure 11:
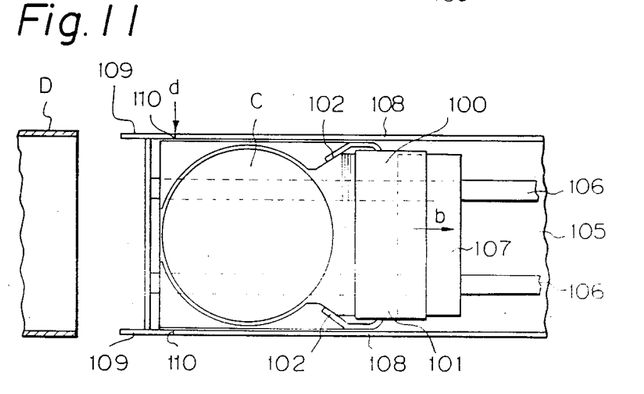
FIG. 11 is a plan view showing the hand mechanism catching a cartridge as it is moved backward.

Referring now to FIG. 7, which shows another embodiment of the hand mechanism, reference numeral 300 designates the hand mechanism and letter D denotes the shelf of the drum shelf in which the cartridge C is contained. Reference numeral 101 designates the body housing of the hand mechanism 300, and reference numerals 102 denote a pair of hands, forwardly projected, provided on the left and right portions of the housing 101. These hands are controlled to their open state, indicated by solid lines in FIG. 8, and their closed state, indicated by dots-and-dash lines in FIG. 8, (indicated by solid lines in FIGS. 7, 9 and 11) by an opening-closing mechanism (for example, of the rack-pinion type, the gear-cam type or the tension wire type) driven by an electromagnetic solenoid or the like, not shown, which is contained in the housing 101. Reference numeral 103 designates a housing front plate between the hands 102 and reference numeral 104 denotes a sensor actuator having its tip end portion projected outwardly from the surface of said front plate.

Reference numeral 105 designates a base board, reference numerals 106 denote longitudinal guide rails disposed on the base board, and reference numeral 107 designates a reciprocally movable carriage driven forward in the direction of arrow a and driven rearward in the direction of arrow b along the guide rails, for example, by a tension wire mechanism or the like. The hand mechanism 300 is mounted and supported on the carriage 107 and is moved toward and away from the caught cartridge C by the carriage 107 being driven forward and rearward in the directions of arrows a and b, respectively.

Reference numerals 108 denote hand opening control members (hereinafter referred to as the guide wall members) upwardly bent along the length of the base board 105 on the left and right sides thereof. The inner wall surfaces of the left and right guide wall members 108 are parallel to the direction of reciprocal movement of the hand mechanism 100, and the dimension $W_{8.8}$ of the spacing between the inner walls is substantially the same as the dimension $W_{2.2}$ between the outer sides of the hands 102 in their closed position.

Reference numerals 109 designate cut-away portions formed in the fore end portions of the left and right guide wall members 108. The position d of the rising sides 110 of the cut-away portions provides the substantial fore end portion of the guide wall members 108, and a spacing f corresponding to at least the dimension of the forwardly projected length of the hands 102 from the housing front plate 103 is present between the position d and the rear end surface e of the cartridge C which is to be caught.

Figure 9:
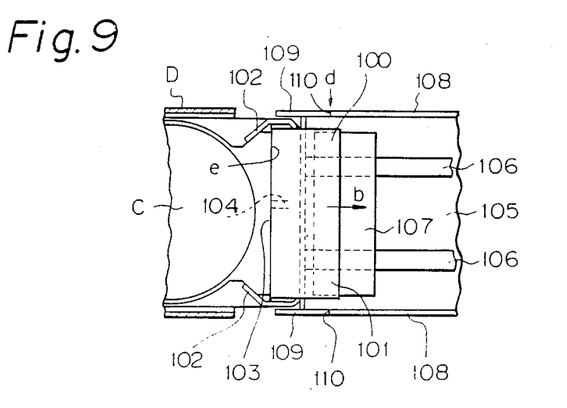
FIG. 9 is a view similar to FIG. 7 but showing the hands as they catch the cartridge in a containing portion.
Figure 10:
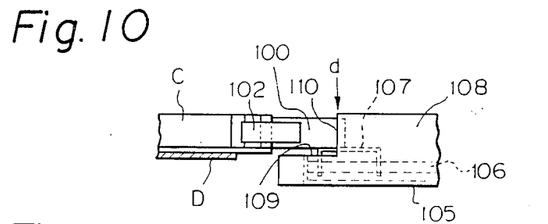
FIG. 10 is a side view of the hands.

Thus, the hand mechanism 300 is moved forward in the direction of arrow a between the left and right guide wall members 108 toward the cartridge C to be caught by the forward movement of the carriage 107 while being in the hand-closed position (FIG. 7). When the hands 102 of the hand mechanism 100 slip out between the fore end portions of the guide wall members 108, that is, arrive at the position d, opening of the hands 102 becomes possible and the mutual opening operation thereof (indicated by solid lines in FIG. 8) is effected. By the continued forward movement of the hand mechanism 300, the rear end portion of the cartridge C is received between the opened hands 102, and the fact that the housing front plate 103 of the hand mechanism 100 has come to bear against the rear end surface e of the cartridge C (FIG. 9) is detected by the pressing of the sensor actuator 104 projected from the front plate 103. Any further forward movement of the hand mechanism 300 is stopped by the detection signal and the hands 102 are closed, and thus the cartridge C is caught by the hands 102 (FIG. 9).

The completion of the closing of the hands 102 is then detected by a sensor, not shown. Whereupon the carriage 107 is moved rearward in the direction of arrow b by the detection signal and the hand mechanism 300 is moved rearward. That is, the cartridge C caught between the hands 102 is drawn out from the shelf D.

The hand mechanism 100 is then moved rearward to its backward movement limit between the left and right guide wall members 108. Even if in this backward movement process (FIG. 11), a swaying force in the opening direction acts on the hands 102 catching the cartridge C due to the vibration of the like of the apparatus, the outer sides of the hands 102 will interfere with the left and right guide wall members 108 proximate thereto, whereby the opening movement will be controlled and the sway of the hands 102 in the opening direction will be substantially locked and prevented.

This opening movement control (locking) of the hands 102 by the guide wall members 108 is effected even in the state in which the hand mechanism 300 has arrived at its backward movement limit, or during the process in which the hand mechanism is driven forward to mount the cartridge onto the cartridge mounting portion, or during the operation of a vertically moving mechanism, a cocking mechanism, a turning (pivoting) mechanism, etc., not shown, for the base board 105, namely, during the conveyance movement such as vertical movement, cocking or turning of the cartridge, or during the process of return conveyance of the used cartridge to the original shelf portion.

Accordingly, the falling off of the cartridge C from between the hands 102 caused by the sway of the hands in the opening direction which results from the vibration or the like of the apparatus during the process of catching and conveying the cartridge C to be caught by the hand mechanism 300 is strictly prevented.

As described above, according to the present invention, the trouble of falling off can be strictly prevented simply by adding the guide wall members without the catching force of the hands for the cartridge to be caught being enhanced more than necessary and accordingly, the cartridge to be caught can be stably caught and conveyed by a compact, light-weight apparatus construction, and thus, the intended purposes can be achieved.

Figure 12:
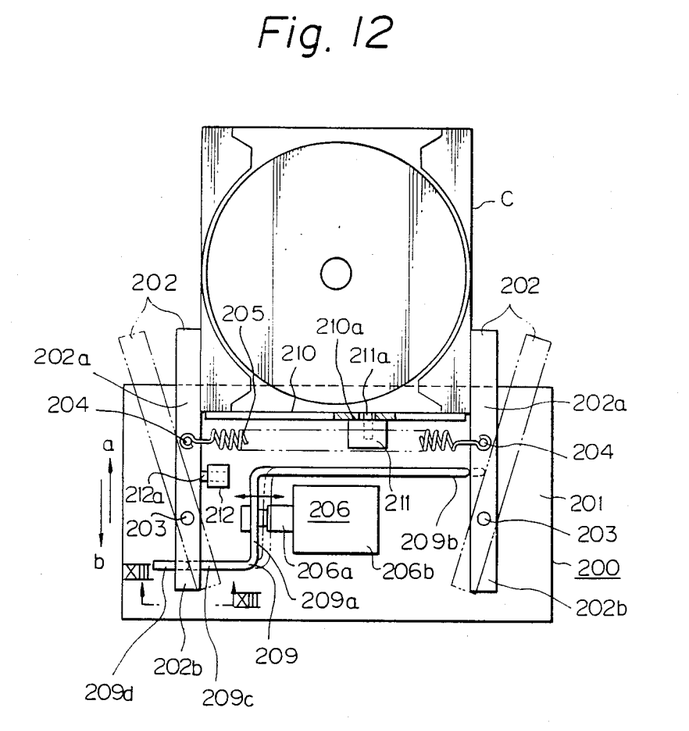
FIG. 12 is a plan view of still another embodiment of the hand mechanism showing the hand mechanism as it catches an object to be gripped.

FIG. 12 shows still another embodiment of the hand mechanism. In FIG. 12, reference numeral 201 designates the chassis of the hand mechanism 200, reference numerals 202 denote levers as a pair of left and right opening-closing hands mounted on the chassis 201 for pivotal movement about shafts 203, respectively, and having their tip end portions projected forwardly of the chassis, reference characters 202a designate the arms of the left and right levers 202 which form fore end portions with respect to the pivot shafts 203, and reference characters 202b denote the arms of said levers 202 which form rear end portions. Reference numerals 204 designate pins studded at the lengthwise substantially intermediate positions of the arms 202a of the levers 202. A tension spring 205 is extended between the pins 204. The left and right levers 202 are normally biased in their mutually closing directions by this spring 205. Reference numeral 206 denotes an electromagnetic solenoid plunger device (SL device) as a drive source secured to the substantially intermediate portion of the chassis between the left and right levers 202. The SL device 206 is disposed with its forward and rearward moving plunger 206a facing rearward with respect to the longitudinal direction of the chassis.

Figure 13:
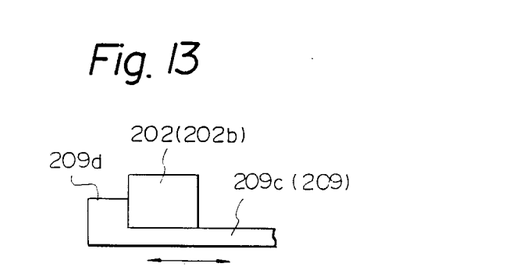
FIG. 13 is a partial enlarged view taken along line XIII—XIII of FIG. 12.

Reference numeral 209 designates a rod member mounted and held on the fore end of the plunger 206a of the SL device 206. This rod member 209 comprises an intermediate base portion 209a, a rightwardly extending arm 209b bent rightward substantially at a right angle at one end of the base portion 209a and extending toward the right lever 202, and a leftwardly extending arm 209c bent leftward substantially at a right angle at the other end of the base portion 209a and extending toward the left lever 202, and is held with its intermediate base portion 209a mounted on the fore end portion of the plunger 206a of the SL device 206. The tip end of the rightwardly extending arm 209b of the rod member 209 is in contact with the inner side of the fore end arm 202a of the right lever 202. On the other hand, an upwardly facing hook portion 209d (FIGS. 12 and 13) is formed at the top end of the leftwardly extending arm 209c of the rod member 209 and is hooked on the rear end arm 202a of the left lever 202 from outside of said arm. That is, the line passing through the right end of the rod member 209 which is in contact with the inner side of the right lever 202 and the left end of the rod member 209 which is in hook engagement with the lever 202 intersects the line passing through the pivot shafts 203 of the left and right levers 202.

Reference numeral 210 designates a chassis front plate between the left and right levers 202, and reference numeral 211 denotes a microswitch disposed on the back side of the chassis front plate. An actuator 211a for the microswitch 211 is projected outwardly from a through-hole 210a formed in the chassis front plate and is adapted to be pushed in when the chassis front plate bears against the rear end surface of the cartridge C. Reference numeral 212 designates a microswitch disposed at such a position that the actuator 211a is pushed by one of the left and right levers 202 when closed.

Thus, when the SL device 206 is electrically energized, the plunger 206a retracts into the solenoid 206b and the rod member 209 is moved rightwardly between the left and right levers 202. Thereupon, the right lever 202 is pushed by the right end of the rod member 209 and is pivoted clockwise about the shaft 203 against the force of the spring 205. On the other hand, the left lever 202 is pulled by the hook portion 209d at the left end of the rod member 209 and is pivoted counter-clockwise about the shaft 203 against the force of the spring 205. That is, the left and right levers 202 are pivoted in their opening directions against the force of the spring 205 and are held open as indicated by dots-and-dash lines as long as the SL device 206 is electrically energized.

With the left and right levers 202 held open, the hand mechanism 200 is moved forward in the direction of arrow a relative to the cartridge C to be caught, and the rear end of the cartridge C is received between the opened levers 202 and, when the front plate 210 of the apparatus chassis bears against the rear end surface of the cartridge C, it is detected by the press-in of the aforementioned microswitch actuator 211a projected outwardly from the surface of the front plate, and any further forward movement of the hand mechanism in the direction of arrow a is stopped by the detection signal while, at the same time, the SL device 206 is electrically deenergized. By this electrical deenergization of the SL device 206, the open state holding force of the left and right levers 202 against the force of the spring 205 is released and the left and right levers 202 are closed relative to each other by the spring 205, and as indicated by solid lines in FIG. 12, the left and right sides of the cartridge C are held between the left and right levers 202 by the closing force of the spring 205 and the cartridge C is caught by the levers 202. The rod member 209 is generally moved leftward to the forward movement starting position while drawing the plunger 206a out of the solenoid 206b by the upward closing pivotal forces of the left and right levers 202.

When the closed position of the levers 202 is detected by the microswitch 212, the hand mechanism 200 catching the cartridge C is moved rearward in the direction of arrow b by the detection signal and the cartridge C is slipped out from the containing shelf and conveyed to the cassette mounting portion of the microfilm reader or the like.

The amount of mutual opening-closing of the left and right levers 202 can be freely set by suitably varying the position of the point at which the opposite end portions of the rod member 209 act on the levers 202 and the bend distance of the rod.

According to the present invention, as described above, a highly reliable, compact, light-weight and practical hand mechanism can be constructed by a small number of parts, and such hand mechanism is effected and suitable, for example, as the cartridge hand mechanism of the CAC apparatus.

We claim:

1. A cartridge auto-changer for changing a square cartridge, comprising:
    storing means for storing a plurality of cartridges;
    conveying means for selectively taking a cartridge out of said storing means to convey the cartridge to a predetermined use position, said conveying means including gripping means for gripping the cartridge and moving means for moving said gripping means to convey the cartridge, said gripping means including a pinching member capable of engaging a pair of first side surfaces of the cartridge and separating it from said storing means and driving means for moving said pinching member to an engaging position and a separating position;
    detecting means for detecting whether a second side surface, perpendicular to the first side surface of the cartridge pinched by said pinching member, is correctly oriented;
    first correcting means for rotating said pinching member when said pinching member is pinching the cartridge to reverse the second side surface of the cartridge in accordance with the orientation detected by said detecting means;
    second correcting means for rotating the cartridge around an axis perpendicular to the second side surface when said pinching member is not pinching the cartridge so that said pinching member engages said first side surface of the cartridge in a correct state; and
    control means for controlling said moving means to convey the cartridge gripped by said pinching member to said second correcting means and the use position.

2. A cartridge auto-changer according to claim 1, wherein said second correcting means is arranged at a correction position different from the use position, and said control means actuates said moving means such that the cartridge taken out of said storing means is conveyed to the use position after the cartridge-has been conveyed to correct position.

3. A cartridge auto-changer according to claim 1, wherein said moving means moves said gripping means in a horizontal and vertical direction.

4. A cartridge auto-changer according to claim 1, wherein said second correcting means includes holding means for holding the cartridge conveyed by said gripping means and means for rotating the cartridge held by said holding means.

5. A cartridge auto-changer according to claim 1, wherein a microfilm is encased in the cartridge.

6. An information processing apparatus comprising:
    storing means for storing a plurality of holding members each holding an information record medium and having a substantially rectangular shape:
    conveying means for selectively taking one of the holding members out of said storing means to convey said holding member to a predetermined use position, said conveying means including gripping means for gripping the holding member and moving means for moving said gripping means to convey the holding member, said gripping means including a pinching member capable of engaging a pair of first side surfaces of the holding member and separating it from said storing means and driving means for moving said pinching member to an engaging position and a separating position;
    processing means for processing the information record medium of the holding member in the use position;
    first detecting means for detecting whether a second side surface, perpendicular to the first side surface of the holding member pinched by said pinching member, is correctly oriented;
    first correcting means for rotating said pinching member when said pinching member is pinching the holding member to reverse the second side surface of the holding member in accordance with the orientation detected by said detecting means;
    second detecting means for detecting whether said pinching member correctly engages the first side surface of the holding member;
    second correcting means for rotating the holding member around an axis perpendicular to the second side surface when said pinching member is not pinching the holding member so that said pinching member engages with the first side surface of the holding member in a correct state; and
    control means for controlling said moving means in such a manner that the holding member is conveyed directly from said storing means to the use position when said second detecting means detects a correct engagement, and the holding member is conveyed to the use position after being conveyed to said second correcting means when said second detecting means detects a noncorrect engagement.

7. An information proceeding apparatus according the claim 6, wherein said first and second detecting means are arranged along a conveying path of the holding member and detect the condition of said one of said holding members while it is being conveyed by said conveying means.

* * * * *

UNITED STATES PATENT AND TRADEMARK OFFICE
CERTIFICATE OF CORRECTION

PATENT NO. : 4,981,409
DATED : January 1, 1991
INVENTOR(S) : Yoshihiko Hirose, et al.

It is certified that error appears in the above-identified patent and that said Letters Patent is hereby corrected as shown below:

COLUMN 2:

Line 48, "that due" should read --that is due--.

COLUMN 5:

Line 62, "direction hold" should read
　　　　　　--direction to hold--.

COLUMN 14:

Line 6, "cartridge-has" should read --cartridge has--.

Line 7, "to correct" should read --to a correct--.

Line 62, "information proceeding apparatus" should read
　　　　　　--information processing apparatus--.

Signed and Sealed this

Fifteenth Day of December, 1992

*Attest:*

DOUGLAS B. COMER

*Attesting Officer*　　　　*Acting Commissioner of Patents and Trademarks*

UNITED STATES PATENT AND TRADEMARK OFFICE
CERTIFICATE OF CORRECTION

PATENT NO. : 4,981,409
DATED : January 1, 1991
INVENTOR(S) : Yoshihiko Hirose, et al.

It is certified that error appears in the above-identified patent and that said Letters Patent is hereby corrected as shown below:

COLUMN 14:

Line 65, "said" (first occurrence) should be deleted.

Signed and Sealed this

Thirtieth Day of November, 1993

Attest:

BRUCE LEHMAN

Attesting Officer

Commissioner of Patents and Trademarks